July 12, 1932.   P. DE VOS   1,866,844
ROTARY SPRINKLER
Filed Oct. 24, 1929
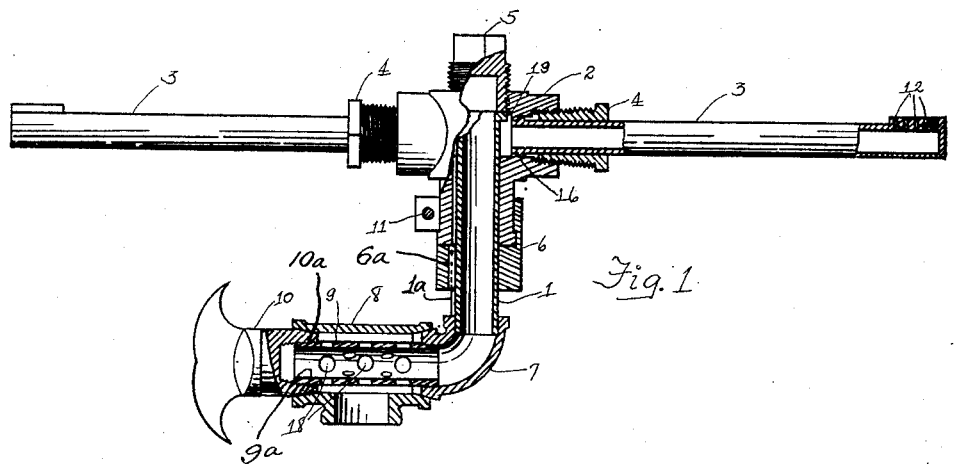
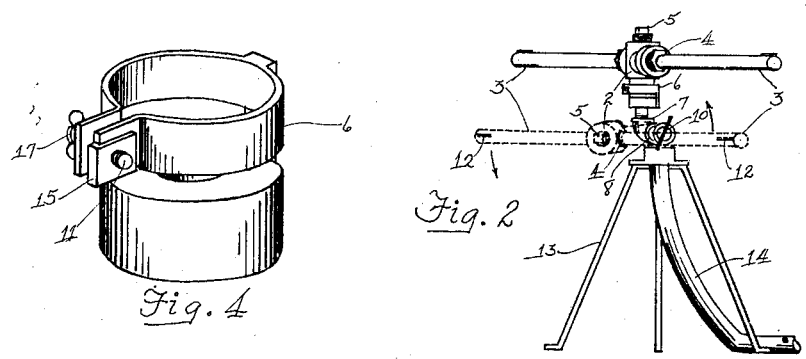
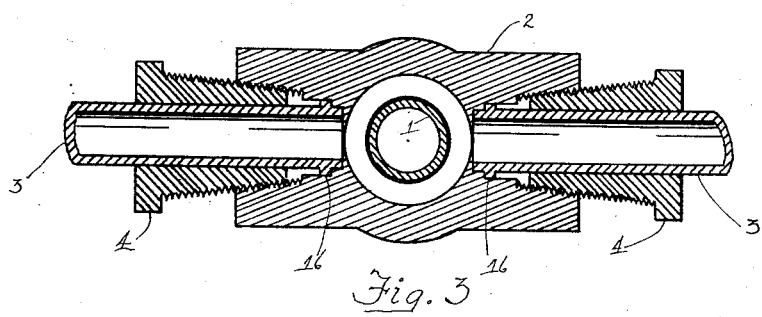
Witness:
Jo...Braddock
INVENTOR.
Peter DeVos
BY
Rice and Rice
ATTORNEYS Patented July 12, 1932

1,866,844

UNITED STATES PATENT OFFICE

PETER DE VOS, OF GRAND RAPIDS, MICHIGAN

ROTARY SPRINKLER

Application filed October 24, 1929. Serial No. 401,991.

The present invention relates to rotary sprinklers.

The object of the invention is to provide an improved rotary water sprinkler, which is adjustable in such manner that (1) the water ejected may be thrown in horizontal, vertical and angular directions, (2) the water ejected may be made to cover small or large areas, and (3) the sprinkler may be rotated faster or slower or caused not to rotate, any of such adjustments being independent of the others and without varying the amount of water ejected. A further object of the invention is to provide a sprinkler of the character described which is simply constructed, economically manufactured and readily assembled.

An illustrative embodiment of the invention is shown in the accompanying drawing, in which:

Figure 1 is a front elevational view partly in section and with portions thereof being broken away;

Figure 2 is an elevational view of the sprinkler in horizontal position and showing in dotted lines the sprinkler disposed in a vertical plane;

Figure 3 is an enlarged fragmentary horizontal sectional view taken through the center of the tubular arms and hub member of the sprinkler; and, Figure 4 is a perspective view of a braking device for the sprinkler.

The invention generally comprises a hub member having laterally extending tubular arms, revolubly mounted upon an annular member. A horizontally disposed internal sleeve member connects with the lower extremity of the central annular member and is pivotally connected to a suitable standard. A braking member for regulating the speed of rotation of the tubular arms is likewise provided.

Referring to the drawing, the hub member 2 is longitudinally slidably mounted on the annular member 1. The tubular arms 3 provided with apertures 12 at their extremities are rotatably fitted to the hub member 2, and exteriorly threaded bushings 4 are adapted to adjustably secure the inner ends of the tubular arms 3 to the hub member 2 to vary the angle of the water thrown. The plug 5 is threaded to an opening in the top of the hub member 2.

A brake member 6 has a lower portion longitudinally slidably mounted on the annular member 1 and the upper portion of the brake member is fitted around the lower portion of the hub member 2. The lower portion of the brake member may be slidably interlocked with the annular member 1 by any suitable means, such as the key 6ª and a keyway 1ª, to hold the brake member against rotary movement on the annular member 1 and at the same time permit a sliding movement of the brake member longitudinally of the annular member 1. This upper portion may be tightened to frictionally engage the lower portion of the hub member by means of the wing nut 17 and the flanged or lipped nut 15 on the screw 11. By tightening or loosening the wing nut, the speed of rotation of the device may be regulated.

Annular flanges 16 are provided on the inner ends of the tubular arms 3 for limiting the lateral movement thereof. A similar annular flange 19 is provided on the upper end of the annular member 1 for stopping the upward or longitudinally slidable movement of the hub member 2. The hub member is caused to slide upwardly by the upward pressure of the water thereon, and thereby providing a cushion of water on which the hub member may rotate.

The horizontally disposed internal sleeve member 9, perforated with the apertures 18, is secured to the lower extremity of the annular member 1 by means of the elbow 7. A T-union 8 is rigidly secured to the standard 13, and connects with the hose 14 and the wing nut 10 is adapted to adjustably secure the sleeve member 9 to the T-union 8 in horizontal, vertical or angular position. The outer end 9ª of the sleeve member 9 is tapered and exteriorly threaded, and the nut 10 is interiorly tapered and threaded at 10ª to engage the tapered end 9ª of the sleeve 9. When the nut is screwed inwardly on the tapered end of the sleeve, it is expanded sufficiently to engage the interior of the T-union frictionally for securing the sleeve in its rotary adjustment.

It will thus be seen that the sprinkler may be adjusted to varying positions in a vertical plane, so that its entire discharge of water may be directed toward a small area, such as a narrow plot, a hedge, or a bush, or the sprinkler may be adjusted to throw the water in a horizontal or angular plane.

The opening in the center of the hub member 2 with which the arms 3 communicate, is of a diameter to receive the flange 19 and admit of the sprinkler head having a free limited vertical movement determined by the depth of the opening and the coacting stop flange 19. The sprinkler head is angularly adjustable in the horizontal sleeve portion of the T union 8 and is held in the adjusted position by tightening the nut 10. It is understood that the ends of the nut 10 and elbow 7 entering the part 8 are tapered slightly to frictionally engage the part 8 by a wedging action and fix the position of the sprinkler head.

The brake is interlocked with the member 2 to move therewith and includes a portion splined to the member 1 to slide freely thereon but prevented from turning. The portion of the brake embracing the member 2 is contractible by means of the screw 11 to engage the part 2 by a greater or less friction and regulate its speed and that of the sprinkler head.

The invention being intended to be pointed out in the claim, is not to be limited to or by details of construction of the particular embodiment thereof illustrated by the drawing or hereinbefore described.

I claim:

In a lawn sprinkler, a standard having a bearing sleeve provided with a lateral water inlet, a sleeve within and spaced from the bearing sleeve and perforated in its sides, a sprinkler head connected with one end of the perforated sleeve and at an angle thereto and engaging the adjacent end of the bearing sleeve, and a nut threaded to the opposite end of and closing the perforated sleeve and frictionally engaging the corresponding end of the bearing sleeve to hold the sprinkler head in the desired angular position.

In testimony whereof I have hereunto set my hand at Grand Rapids, Michigan, this 18th day of October, 1929.

PETER DE VOS.